US010285093B2

(12) United States Patent
Chechani

(10) Patent No.: US 10,285,093 B2
(45) Date of Patent: *May 7, 2019

(54) AUTOMATICALLY DEPLOYED WIRELESS NETWORK

(71) Applicant: Fortinet, Inc., Sunnyvale, CA (US)

(72) Inventor: Pankajkumar V. Chechani, Santa Clara, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/957,966

(22) Filed: Dec. 3, 2015

(65) Prior Publication Data

US 2016/0373963 A1 Dec. 22, 2016

Related U.S. Application Data

(63) Continuation of application No. 14/744,642, filed on Jun. 19, 2015, now Pat. No. 10,039,031.

(51) Int. Cl.
H04W 28/08 (2009.01)
H04W 28/02 (2009.01)
(Continued)

(52) U.S. Cl.
CPC ........... H04W 28/08 (2013.01); B64C 39/024 (2013.01); G05D 1/104 (2013.01);
(Continued)

(58) Field of Classification Search
CPC ..... H04W 28/08; H04W 16/22; H04W 24/02; H04W 24/04; H04W 28/021;
(Continued)

(56) References Cited

U.S. PATENT DOCUMENTS 9,363,008 B2 6/2016 Boss et al.
9,813,925 B2 11/2017 Ramanath
(Continued)

FOREIGN PATENT DOCUMENTS

JP  WO 2016198816 A1 * 12/2016 ............ H04W 28/26
WO WO-2016198816 A1 * 12/2016 .......... H04W 64/003
WO WO-2017189198 A1 * 11/2017 ......... H04B 7/18504

OTHER PUBLICATIONS

Uchida, Noriki, et al. "Proposal of seeking wireless station by flight drones based on delay tolerant networks." Broadband and Wireless Computing, Communication and Applications (BWCCA), 2014 Ninth International Conference on. IEEE, 2014.*
(Continued)

Primary Examiner — Walli Z Butt
(74) Attorney, Agent, or Firm — Jaffery Watson Mendonsa & Hamilton Desanctis & Cha LLP

(57) ABSTRACT

Systems and methods for an automatically deployed wireless network are provided. According to one embodiment, an access point controller (AC) determines the existence of a network anomaly at a position of a wireless network that is managed by the AC. Responsive thereto, the AC causes an unmanned vehicle that carries a movable access point (AP) to carry the movable AP to the position or proximate thereto and causes the movable AP to provide wireless network service to an area encompassing the position by sending a dispatch command to the unmanned vehicle. The dispatch command instructs the unmanned vehicle to move to the position or proximate thereto.

16 Claims, 7 Drawing Sheets

(51) Int. Cl.
*B64C 39/02* (2006.01)
*G05D 1/10* (2006.01)
*H04W 16/22* (2009.01)
*H04W 24/02* (2009.01)
*H04B 7/185* (2006.01)
*H04W 24/04* (2009.01)
*H04W 84/12* (2009.01)
*H04W 16/18* (2009.01)
*H04W 88/08* (2009.01)

(52) U.S. Cl.
CPC ........ *H04B 7/18504* (2013.01); *H04W 16/22* (2013.01); *H04W 24/02* (2013.01); *H04W 24/04* (2013.01); *H04W 28/021* (2013.01); *H04W 28/0289* (2013.01); *B64C 2201/024* (2013.01); *B64C 2201/027* (2013.01); *B64C 2201/122* (2013.01); *B64C 2201/141* (2013.01); *B64C 2201/145* (2013.01); *H04W 16/18* (2013.01); *H04W 84/12* (2013.01); *H04W 88/08* (2013.01)

(58) Field of Classification Search
CPC . H04W 28/0289; H04W 16/18; H04W 84/12; H04W 88/08; B64C 39/024; B64C 2201/024; B64C 2201/122; B64C 2201/141; G05D 1/104; H04B 7/18504
USPC ....... 370/225, 248, 252, 254, 255, 316, 338; 455/406, 456.1; 709/224
See application file for complete search history.

(56) References Cited

U.S. PATENT DOCUMENTS

| | | | |
|---|---|---|---|
| 10,039,031 | B2 | 7/2018 | Chechani |
| 2008/0040476 | A1 | 2/2008 | Ishihara et al. |
| 2012/0087281 | A1* | 4/2012 | Rahman ................ H04W 8/005 370/255 |
| 2013/0184000 | A1* | 7/2013 | Cook .................... H04W 4/023 455/456.1 |
| 2013/0332597 | A1 | 12/2013 | Kumar |
| 2014/0355476 | A1* | 12/2014 | Anderson ............ H04W 24/02 370/254 |
| 2015/0146544 | A1* | 5/2015 | Liu ..................... H04L 43/0811 370/248 |
| 2016/0028471 | A1* | 1/2016 | Boss .................... H04W 84/06 455/406 |
| 2016/0150427 | A1* | 5/2016 | Ramanath ............ H04W 24/06 370/252 |
| 2016/0373942 | A1 | 12/2016 | Chechani |
| 2017/0013476 | A1* | 1/2017 | Suthar .................. H04W 24/02 |
| 2017/0302362 | A1* | 10/2017 | High .................. H04B 7/18502 |
| 2018/0007518 | A1* | 1/2018 | O'Berry ................ H04W 4/046 |

OTHER PUBLICATIONS

U.S. Appl. No. 14/744,642, filed Jun. 19, 2015.
Notice of Allowance for U.S. Appl. No. 14/744,642 dated Feb. 2, 2018.
Final Rejection for U.S. Appl. No. 14/744,642 dated Oct. 18, 2017.
Non-Final Rejection for U.S. Appl. No. 14/744,642 dated Apr. 7, 2017.

* cited by examiner

AUTOMATICALLY DEPLOYED WIRELESS NETWORK

CROSS-REFERENCE TO RELATED PATENTS

This application is a continuation of U.S. patent application Ser. No. 14/744,642, filed on Jun. 19, 2015, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it Appears in the Patent and Trademark Office patent files or records, but otherwise reserves all rights to the copyright whatsoever. Copyright © 2015, Fortinet, Inc.

BACKGROUND

Field

Embodiments of the present invention generally relate to the field of wireless networking. In particular, various embodiments relate to a wireless network with one or more automatically deployed wireless access points (APs).

Description of the Related Art

Wireless access points (APs) are deployed to cover public areas, offices and families so that Wi-Fi-enabled devices may be connected to a private network or the Internet through a wireless network. When a large number of APs are deployed in an enterprise network, the wireless APs are connected to a wireless access point controller (AC) and are managed by the AC. Usually, an AP has the physical capacity to handle 2048 media access control (MAC) addresses. However, a wireless AP is a shared medium and acts as a wireless hub and the performance of each client connected to the AP decreases as the number of clients on the AP increases. Generally, the maximum number of clients that can associate with the AP may be several dozen based on the types of clients. When deploying a wireless network within a venue in which a large number users may present (e.g., as an airport, a university, a stadium, a hospital, an office building or an enterprise campus) one of the biggest challenges is inadequate coverage that will ultimately lead to poor application performance. Some wireless network planning tools, such as Fortinet's FortiPlanner software, have been introduced to facilitate planning of wireless networks. The planning tools may import a floor-plan of a building, draw in obstructions, select the type of APs and automatically calculate the number and placement of APs. The tools may use sophisticated signal propagation ray tracing algorithms to estimate signal loss and bounce based on objects that can cause radio frequency interference, such as walls, windows and elevator shafts. The planning tools may select various deployment scenarios such as Voice over Internet Protocol (VoIP), high priority data or normal, to ensure adequate wireless Local Area Network (LAN) coverage and prepare a plan including the number and placement of APs within the venue at issue.

FIG. 1 shows a typical wireless network system 100. The wireless network system 100 includes multiple fixed access point (APs) 110a-e that are mounted at different locations within a building. Each AP 110a-e can provide a WiFi connection for WiFi clients/users 120 that are within its coverage. WiFi clients 120 may access a private or public network, such as the Internet 140 through the APs. APs 110a-e may be connected to an access point controller (AC) 130 through cables. AC 130 may push AP profiles to APs 110a-e and manage the wireless connectivity of APs 110a-e so that a WiFi client may roam between APs 110a-e and network traffic of nearby APs may be load-balanced by AC 130. For example, at an airport terminal where 100 WiFi clients may present, APs 110a-c may be deployed on the ceiling of the terminal. When multiple WiFi clients 120 are within the coverage areas of APs 110a-c, traffic associated with WiFi clients 120 may be distributed among APs 110a-c by AC 130 based on the signal strengths and/or the network speed provided to the WiFi clients. When one of the APs (e.g., AP 110a) reaches its maximum throughput, a connection request to AP 110a from a new WiFi client may be transferred to a nearby AP, such as AP 110b, which still has sufficient capacity to provide adequate WiFi service.

For economic reasons, APs that are deployed within a venue are limited to a reasonable number based on estimates regarding the number of wireless users that may be present at any given time. Therefore, the number of users that may be served by the wireless network is limited. When the number of users exceeds the maximum number of users that can be served by one or more APs, network congestion occurs and APs cannot provide WiFi service to some users. Further, APs may fail to provide WiFi service for other reasons, such as AP failures, power failures, cable failures and the like. It is time consuming to install new APs. Therefore, there is a need for an automatically deployed wireless network that can meet the needs of WiFi users and provide more stable and flexible services to the users.

SUMMARY

Systems and methods are described for an automatically deployed wireless network. According to one embodiment, an access point controller (AC) determines the existence of a network anomaly at a position of a wireless network that is managed by the AC. Responsive thereto, the AC sends a dispatch command to an unmanned vehicle that carries a movable access point (AP) to instruct the unmanned vehicle to move to the position.

Other features of embodiments of the present invention will be Apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
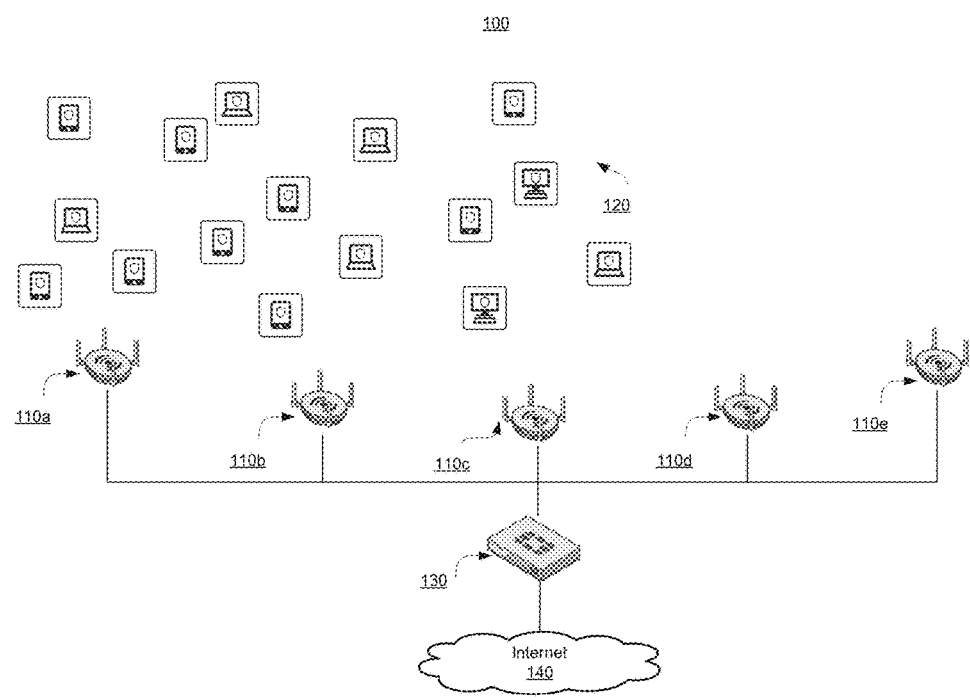
FIG. 1 illustrates a typical prior art wireless network architecture.

Systems and methods are described for an automatically deployed wireless network. According to one embodiment, an access point controller (AC) determines a network anomaly that occurs at a position of a wireless network managed by the AC. The AC sends a dispatch command to an unmanned vehicle that carries a movable AP (AP) to instruct the unmanned vehicle to move to the position. The unmanned vehicle carries the movable AP to the position and the movable AP provides wireless network service at the position.

In the following description, numerous specific details are set forth in order to provide a thorough understanding of embodiments of the present invention. It will be Apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/ machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with Appropriate standard computer hardware to execute the code contained therein. An Apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this Application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The term "unmanned vehicle" generally refers to a mechanical or electro-mechanical machine that may be guided or controlled by a computer program, electronic circuitry and/or a human operator. Non-limiting examples of unmanned vehicles include automated guided vehicles, such as quadracopters, aerial drones or other remote flying or ground-based vehicles. Unmanned vehicles may move by flying, crawling using legs, following lines or by being wheel-based.

Figure 2:
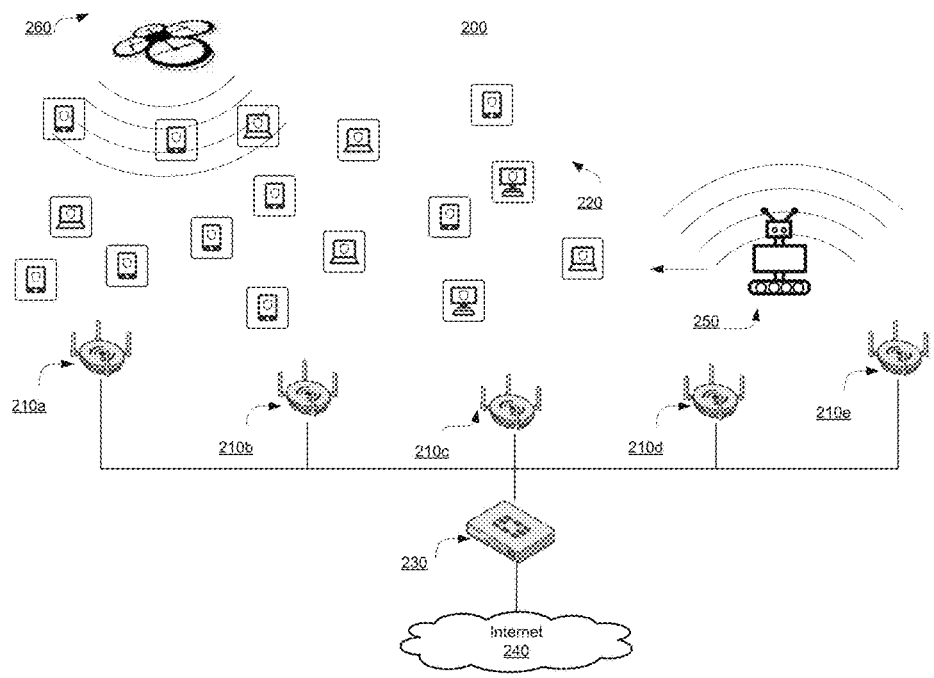
FIG. 2 illustrates an exemplary wireless network architecture in accordance with an embodiment of the present invention.

FIG. 2 illustrates an exemplary wireless network system 200 in accordance with an embodiment of the present invention. In the example, wireless network 200 may include multiple fixed APs 210*a-e*, an AC 230, movable APs 250 and 260. Fixed APs 210a-e may be mounted at fixed positions within the venue at issue. The positions of fixed APs 210a-e may be registered with AC 230 before or after APs 210a-e are mounted and installed within wireless network 200. The positions of the fixed APs may be GPS positions if the fixed APs are mounted outdoors, and the positions may be 2D or 3D coordinates in a floor-plan of a building if the fixed APs are mounted indoors. When APs 210a-e are connected to wireless network 200, management channels, such as Control and Provisioning of Wireless Access Points (CAPWAP) control tunnels, are established between APs 210a-e and AC 230. AC 230 may distribute operating system images, configuration settings and/or AP profiles to APs 210a-e. AP profile may include service set identification (SSID), security and authentication that will be used by the APs to establish wireless LAN connections. For example, all APs 210a-e may accept the same AP profile from AC 230 and broadcast the same SSID and authenticate WiFi clients 220 according to authentication protocols, such as 802.11 1x. AC 230 may also manage the traffic transferred from/to APs 210a-e based on security policies and load-balance network traffic among adjacent fixed APs. AC 230 may also monitor the operations of APs 210a-e in real time to determine if WiFi services within a particular area are available and sufficient for all the users. When AC 230 detects that WiFi services at an AP are experiencing an anomaly or are insufficient as a result of a WiFi service failure, network congestion or the like, AC 230 determines out the location of the AP at issue and instructs one or more of multiple movable APs 250 and 260 to move to address the situation.

Movable APs 250 or 260 may be a movable AP that is integrated with or carried by a movement mechanism that can be directed from one place to another. The movement mechanism may be an unmanned vehicle, such as an unmanned aerial vehicle (UAV) or an unmanned ground vehicle (UGV). For example, movable AP 250 may be a self-contained robot that carries one or more APs. When movable AP 250 receives an instruction from AC 230, it may automatically drive itself to the instructed destination by its auto-pilot system. Movable AP 260 may be a drone integrated with an AP that may fly to the destination by remote control or auto-pilot. When movable APs 250 or 260 arrive at the destination instructed by AC 230, they may connect to wireless network 200 through a mesh network root AP and begin to provide WiFi services to clients that were otherwise unable to be served by the current APs.

In general, a wireless network may maintain one or more movable APs for quick deployment of APs to provide temporary or supplemental WiFi services at a location or within a particular area. If a network outage or congestion occurs and new WiFi service is needed to be deployed quickly at a particular location or within a particular area, AC 230 may direct a movable AP to the location or area at issue. The movable AP may move or fly to the designated destination and provide WiFi services when it arrives at the destination. With the movable APs, WiFi services may be automatically deployed based on the status or usage of the wireless network. WiFi services may be restored or increased promptly by the movable APs. The functions and operations of AC 230 and movable APs 260 and 250 will be described in further detail below with reference to FIGS. 3-6.

Figure 3:
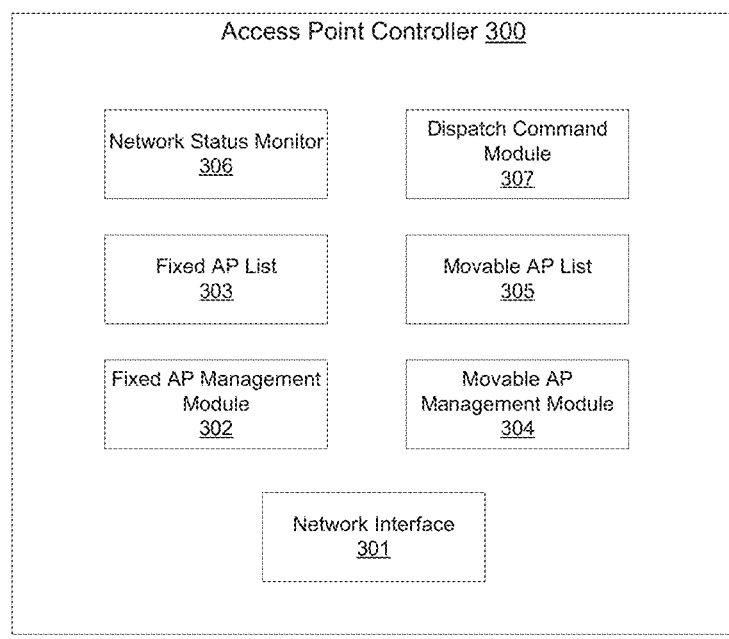
FIG. 3 illustrates exemplary functional units of an access point controller (AC) in accordance with an embodiment of the present invention.

FIG. 3 illustrates exemplary functional units of an access point controller (AC) 300 in accordance with an embodiment of the present invention. In the example, access point controller 300 includes network interface 301, fixed AP management module 302, fixed AP list 303, movable AP management module 304, movable AP list 305, network status monitor 306, and dispatch command module 307.

Network interface 301 may include, but is not limited to, an internal interface with 4-24 or more Ethernet ports, 1-4 or more wide area network (WAN) interfaces and one demilitarized zone (DMZ) interface. AC 300 may connect APs of a private wireless network through the internal interfaces and connect to a public network, such as the Internet, through the WAN interfaces. It will be apparent to one skilled in the art that AC 300 may be a cloud-based access point controller that may connect to APs through the Internet and manage APs across the Internet from a remote location.

Fixed AP management module 302 is used for managing APs of a wireless network. A data tunnel and a control tunnel may be established between a fixed AP and fixed AP management module 302 through network interface 301. Control messages may be exchanged between fixed AP management module 302 and the AP through the control tunnel, and network traffic from/to the AP may be transmitted through the data tunnel. AP profiles of a private wireless network may be pushed to APs. Fixed AP management module 302 may also perform load-balancing among adjacent APs to avoid network congestion on an AP and improve performance of the wireless network. The administrator of AC 300 may also setup policies in order that network traffic going through APs may be scanned based on the policies.

Fixed AP list 303 is used for registering APs of the wireless network managed by AC 300. Fixed AP list 303 may record the identification of each fixed AP and the physical position where the fixed AP is mounted. The physical position may be a GPS position or 2D or 3D coordinates within a floor-plan of a building, for example.

Movable AP list 305 is used for registering movable APs of the wireless network managed by AC 300. Movable AP list 305 may record the identification of each movable AP and a position at which the movable AP is currently located. The physical position may be a GPS position or 2D or 3D coordinates within a floor-plan of a building, for example.

Movable AP management module 304 is used for managing operations of movable APs. Because movable APs can move to different locations and join different private wireless networks, movable AP management module 304 may trace the current positions of movable APs and update movable AP list 305 accordingly. When a movable AP is about to move to a new location and join a new private wireless network, an AP profile of the private network is pushed to the movable AP by movable AP management module 304. If the movable AP needs to join the private network through mesh networking, movable AP management module 304 may also push mesh network profile including parameters, such as mesh SSID and mesh AP password, to the movable AP in order that the movable AP can connect to a root AP of the wireless network and join the wireless network.

Network status monitor 306 is used for monitoring the status of the wireless network that is managed by access point controller 300. Network status monitor 306 may send a test message, such as a keep-alive message to each AP of the wireless network periodically to determine if each AP is working normally. If the no response to the test message is not received from an AP, network status monitor 306 may determine that the AP is dead. In another example, network status monitor 306 may monitor the number of WiFi clients that are connected to an AP. If the number reaches the maximum number of WiFi clients that the AP can serve, network status monitor 306 may determine that a network congestion occurs at the AP. In a further example, network status monitor 306 may monitor the load-balancing of multiple adjacent APs. If a connection request from a new WiFi client cannot be served by an AP and cannot be transferred to adjacent APs, network status monitor 306 may determine that a network congestion occurs. In a further example, network status monitor 306 may predict if a network congestion is to be occurred by watching the trend of the network traffic going through the APs of the wireless network. If the network traffic is increasing fast and nearly reach the maximum throughput of the APs, network status monitor 306 may predict that a network congestion will occur and a new AP should be deployed to meet the demands. In a further example, network status monitor 306 may predict a network congestion based on an event schedule. For example, if an event that many WiFi users may present is to be held at a place where fixed APs at the place do not have the capacity to support all the users, the AC may predict that a network congestion may occur. If network status monitor 306 determines or predicts that not enough WiFi service is provided by one or more APs, it may inform the identification(s) of the AP(s) to dispatch command module 307 so that a movable AP may be deployed to increase or restore WiFi service.

Dispatch command module 307 is used for controlling a movable AP to move to a location or area in which more WiFi service resources are needed/desired. When dispatch command module 307 receives the identifications of APs that cannot provide sufficient WiFi services, dispatch command module 307 may check fixed AP list 303 to determine the locations of the APs. Dispatch command module 307 may further determine the best location to which deploy a movable AP to provide WiFi service. The best location may be determined with the assistance of WiFi planning tools and/or based on a map of the premises at issue. Then, dispatch command module 307 may check the locations of movable APs in movable AP list 305 and select the best, usually the nearest, movable AP that is to be moved to the location. A route from the current location of the movable AP to the destination where additional or new WiFi service resources are needed may be calculated by dispatch command module 307 based on a map of the premises in which the wireless network is deployed. Dispatch command module 307 may establish a control tunnel with the selected movable AP through network interface 301 and send identifications of failed APs, the destination or the route to the movable AP. Dispatch command module 307 may also receive feedback from the movable AP when it is moving to the destination. If the feedback indicates that the movable AP cannot get to the destination, dispatch command module 307 may select a second movable AP from movable AP list 305 and order the second movable AP to move to the destination.

Figure 4:
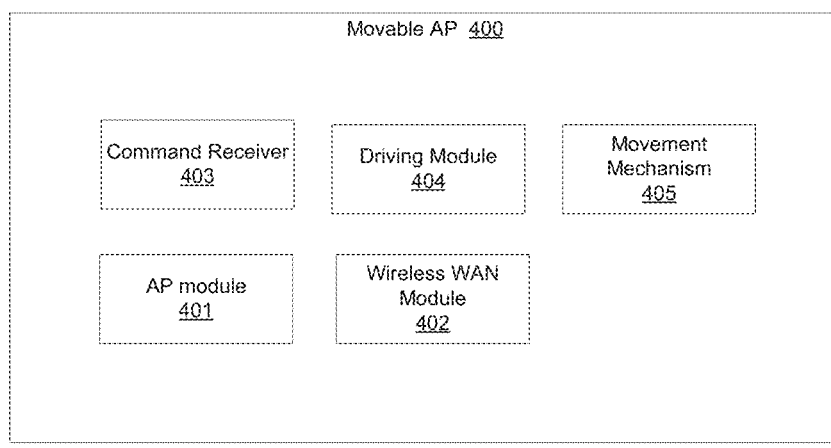
FIG. 4 illustrates exemplary functional units of a movable access point (AP) in accordance with an embodiment of the present invention.

FIG. 4 illustrates exemplary functional units of a movable access point (AP) in accordance with an embodiment of the present invention. In this example, movable AP 400 includes AP module 401, wireless WAN module 402, dispatch command receiver 403, driving module 404 and movement mechanism 405.

AP module 401 is used for providing WiFi connectivity to WiFi clients. AP module 401 may establish a tunnel, such as a CAPWAP tunnel, with an AC. AP module 401 may be configured with one or more AP profiles that be received from the AC. An AP profile typically includes connection-related information including, for example, service set identification (SSID), security, authentication, encryption and etc. AP module 401 may broadcast the SSID of the AP profile and a WiFi client within the coverage of the AP 400 may select and connect to the wireless network through the SSID and corresponding authentication. AP module 401 may also be configured with a mesh network profile that may include a mesh SSID, user id and password for connecting to a mesh network root AP. The mesh network profile maybe received from the AC. Network traffic from the WiFi clients that connected to AP module 401 may be transmitted to the AC through a data tunnel and then routed to the Internet by the AC. The functions and operation of AP module 401 is well known to those skilled in the art further description will be omitted.

Wireless WAN module 402 is an optional module that may provide wireless WAN connection to the Internet through a wireless backhaul network, such as a 3G or 4G wireless network. Wireless WAN module 402 may be 3G/4G network dongle that couples with movable AP 400 through a USB interface. Movable AP 400 may connect to the Internet through wireless WAN module 402 if it cannot connect to a local area network through a root AP of a mesh networking. The wireless WAN connection may be shared by WiFi clients that connected to movable AP 400. A control tunnel between movable AP 400 and an AC may also be established through the wireless WAN connection.

Dispatch command receiver 403 is used for receiving movement commands from an AC. In the present example, a movement command may be received through a control tunnel established between AP 400 and the AC as mentioned above.

Driving module 404 is used to drive movement mechanism 405 to carry movable AP 400 to the designated destination. In one example, driving module 404 may include an auto-pilot system. After receiving the designated destination from dispatch command receiver 403, the auto-pilot system of driving module 404 may calculate a route from the current position to the designated destination based on a map or a floor-plan of a premises in which the wireless network is deployed. Then, the auto-pilot system may drive movement mechanism 405 to the designated destination along the route. In another example, if the route to the destination is included in the dispatch command received from the AC, driving module 404 may follow turn-by-turn instructions in the route provide by the AC and drive movable AP 400 to the designated destination.

Figure 5:
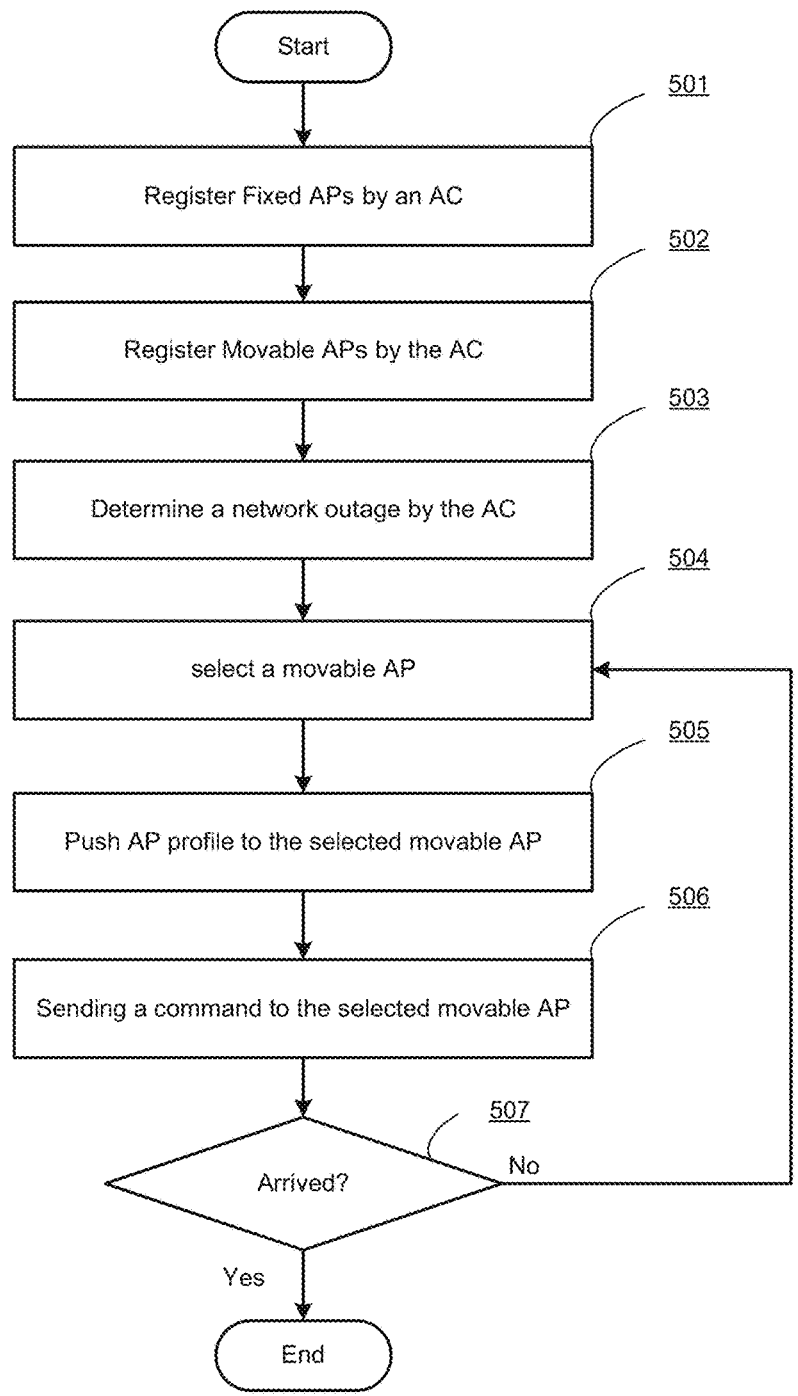
FIG. 5 is a flow diagram illustrating a method for controlling the deployment of a wireless network by an access point controller in accordance with an embodiment of the present invention.

FIG. 5 is a flow diagram illustrating a method for controlling the deployment of a wireless network by an access point controller in accordance with an embodiment of the present invention.

At block 501, an AC registers identifications and locations of fixed APs after the fixed APs are installed or connected to a wireless network that is managed by the AC. This information may be transmitted from APs to the AC through a network connection, such as a CAPWAP tunnel. The AC may also push an AP profile to the fixed APs.

At block 502, the AC registers identifications and current locations of movable APs through a network connection, such as a CAPWAP tunnel or a cable, such as a USB cable. The AC may maintain a list of movable APs that registered with it. The AC may also push an AP profile and/or a mesh network profile to the fixed APs.

At block 503, the AC determines the existence of an anomaly within the wireless network. For example, the AC may observe or be alerted to a network outage or the existence of congestion at a location or within a particular area of the wireless network. The AC may monitor the status of each AP of the wireless network by sending keep-alive messages periodically to the APs. If no response is received from an AP, the AC may determine that a network outage has occurred at the location of the AP. The AC may also monitor the network traffic going through the APs. If a request from a new WiFi client cannot be served by an AP or a maximum number of users is reached at an AP, the AC may determine the existence of network congestion at the location of the AP.

At block 504, the AC selects a movable AP to be moving to the location where the network outage or congestion occurred and more WiFi service resources are needed within the wireless network. Usually, if the movable APs are stored at a fixed location, then any one may be selected and released. If the movable APs have been deployed at different places of the wireless network, the one that is closest to the destination may be selected by the AC.

At block 505, the AC may push an AP profile that is used by the wireless network associated with the destination at issue to the selected movable AP if the movable AP does not already have the AP profile. A mesh profile may also be pushed to the movable AP if the movable AP needs to join the wireless network at the destination through a root AP of a mesh networking.

At block 506, the AC sends a dispatch command to the movable AP to deploy the movable AP to the location where new or additional WiFi service resources are needed. The command may include the identification of the AP that has failed or is causing congestion, the GPS position or 2D/3D coordinates of the destination or the route to the destination.

At block 507, the AC may receive feedback from the movable AP and check if the movable AP arrives at the destination. If it does not arrive at the destination in a period, the AC may select another movable AP to go to the destination.

Figure 6:
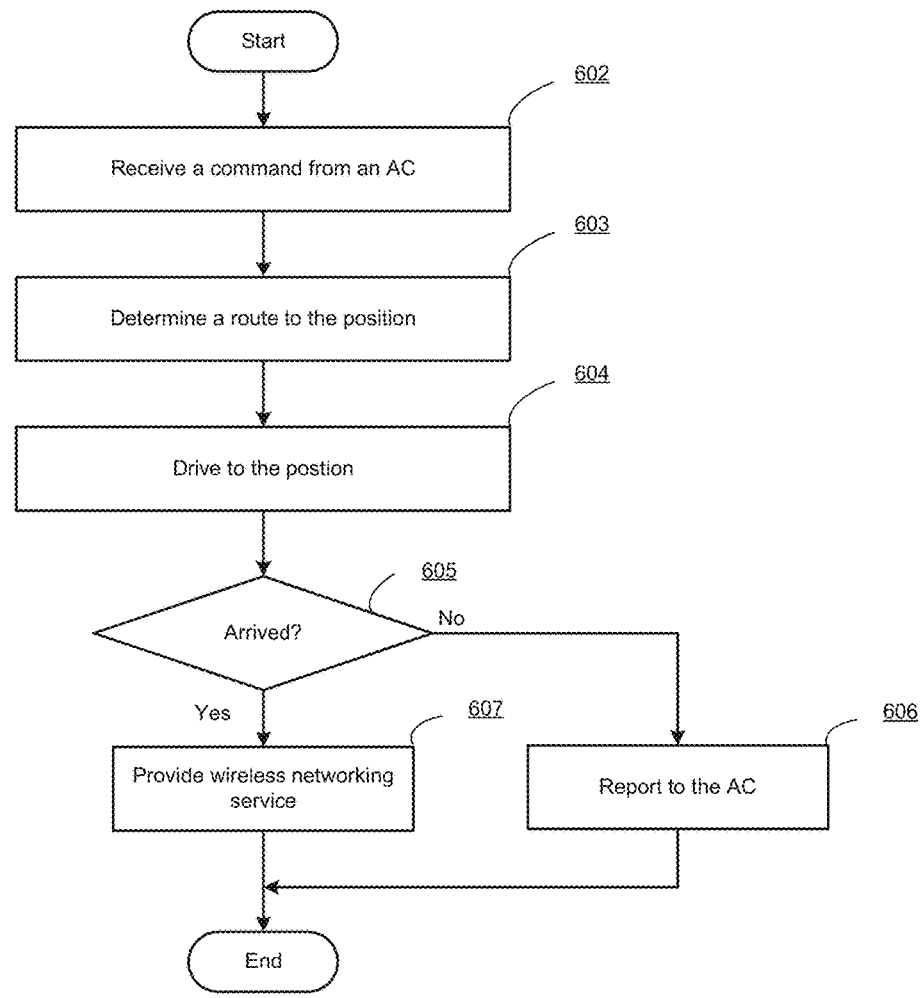
FIG. 6 is a flow diagram illustrating a method for deploying of a wireless network by a movable access point in accordance with an embodiment of the present invention.

FIG. 6 is a flow diagram illustrating a method for deploying of a wireless network by a movable access point in accordance with an embodiment of the present invention. At block 602, a movable AP receives a dispatch command from an AC by a movable AP. The command may include an identification of a fixed AP and/or a destination to which the movable AP is to be deployed to provide WiFi service. The destination may be a GPS position or 2D/3D coordinates within a floor plan of a premises. The movable AP may also determine the location of the fixed AP by checking a fixed AP list of the wireless network.

At block 603, if the dispatch command does not include a route to the destination for the movable AP to follow, the movable AP may calculate a route from the current location of the movable AP to the designated destination. The route may include turn-by-turn instructions that can direct the movable AP to the destination.

At block 604, the movable AP drives itself to the destination. In one example, it may move to the destination by its autopilot system if the movable AP is a self-contained vehicle. In another example, the movable AP may be remotely controlled by the AC or a remote controller and follow the dispatch command to go to the destination.

At block 605, the movable AP detects if it is arrived at the destination.

At block 606, the movable AP may also report its current position to the AC through a network connection with the AC.

At block 607, when the movable AP has arrived at the destination, the movable AP starts to provide WiFi service. In one example, the movable AP may connect to a root AP using a mesh SSID and the authentication parameters to join the wireless network. After the movable AP joins the wireless network, the movable AP may broadcast the SSID of wireless network and provide WiFi service to WiFi clients.

In another example, the movable access point may include a wireless backhaul network module, such as 3G/4G network dongle, that can establish a wide area network connection. The movable access point may provide network connectivity by sharing the wide area network connection to the WiFi clients of the movable access point without join the wireless network.

Figure 7:
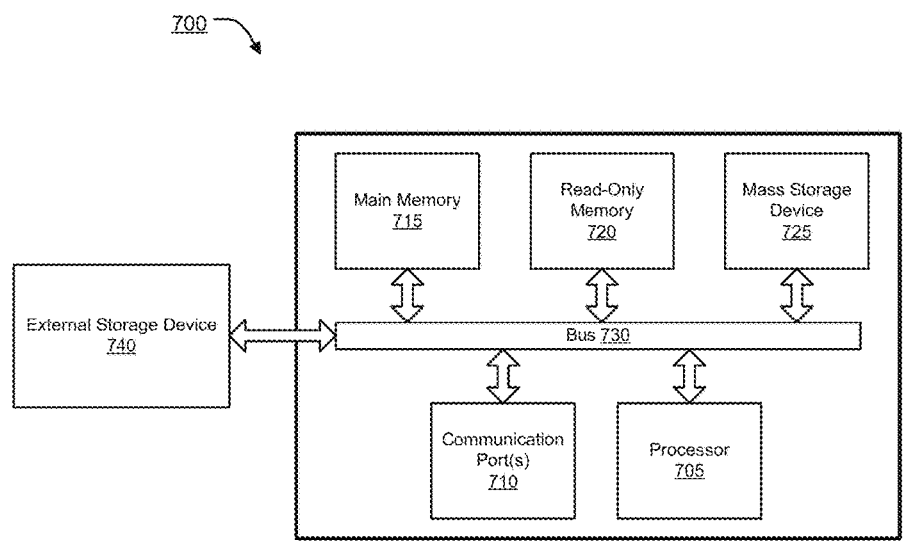
FIG. 7 is an exemplary computer system in which or with which embodiments of the present invention may be utilized.

FIG. 7 is an example of a computer system 700 with which embodiments of the present disclosure may be utilized. Computer system 700 may represent or form a part of a movable AP, an AC, a network appliance, a server or a client workstation.

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 700 includes a bus 730, a processor 705, communication port 710, a main memory 715, a removable storage media 740, a read only memory 720 and a mass storage 725. Those skilled in the art will appreciate that computer system 700 may include more than one processor and more than one communication port.

Examples of processor 705 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 705 may include various modules associated with embodiments of the present invention.

Communication port 710 can be any of an RS-232 port for use with a modem based dialup connection, a 10/100 Ethernet port, a Gigabit or 10 Gigabit port using copper or fiber, a serial port, a parallel port, or other existing or future ports. Communication port 710 may be chosen depending on a network, such a Local Area Network (LAN), Wide Area Network (WAN), or any network to which computer system 700 connects.

Memory 715 can be Random Access Memory (RAM), or any other dynamic storage device commonly known in the art. Read only memory 720 can be any static storage device(s) such as, but not limited to, a Programmable Read Only Memory (PROM) chips for storing static information such as start-up or BIOS instructions for processor 705.

Mass storage 725 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 730 communicatively couples processor(s) 705 with the other memory, storage and communication blocks. Bus 730 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 705 to system memory.

Optionally, operator and administrative interfaces, such as a display, keyboard, and a cursor control device, may also be coupled to bus 730 to support direct operator interaction with computer system 700. Other operator and administrative interfaces can be provided through network connections connected through communication port 710.

Removable storage media 740 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be Apparent to those skilled in the art, without departing from the spirit and scope of the invention, as described in the claims.

What is claimed is:

1. A WiFi access point controller (AC) comprising:
a memory having stored therein one or more routines;
one or more processors configured execute the one or more routines to perform a method comprising:
determining, by the AC, existence of a network anomaly at a position within a wireless network managed by the AC;
sending, by a dispatch command module in the AC, a dispatch command through a control tunnel to a first unmanned vehicle that carries a first movable WiFi access point (AP) to instruct the first unmanned vehicle to move to the position, wherein the dispatch command comprises an identification of a failed AP; and
pushing, by the AC, a mesh profile of the wireless network to the first movable AP.

2. The AC of claim 1, wherein the method further comprises:
registering, by the AC, a position of a fixed WiFi access point (AP) within the wireless network;
detecting, by the AC, an amount of network traffic traversing the fixed AP; and
wherein said determining, by the AC, existence of a network anomaly further comprises determining, by the AC, existence of an occurrence of network congestion at the position of the fixed AP when the amount of network traffic traversing the fixed AP exceeds a predefined threshold.

3. The AC of claim 1, wherein the method further comprises:
registering, by the AC, positions of a plurality of fixed WiFi access points (APs) within the wireless network;
detecting, by the AC, an amount of network traffic traversing each of the plurality of fixed APs;
wherein said determining, by the AC, existence of a network anomaly further comprises determining, by the AC, existence of the network anomaly at the position when the network traffic is not load-balanced among those of the plurality of fixed APs that are proximate to the position.

4. The AC of claim 1, wherein said determining, by the AC, existence of a network anomaly further comprises predicting, by the AC, that network congestion is likely to occur at the position within a predetermined amount of time based on a trend of network traffic traversing one or more fixed WiFi access points (APs) within the wireless network proximate to the position.

5. The AC of claim 1, wherein said determining, by the AC, existence of a network anomaly further comprises predicting, by the AC, that network congestion is likely to occur at the position based on a schedule of an event.

6. The AC of claim 1, wherein said determining, by the AC, existence of a network anomaly further comprises:
sending, by the AC, a keep alive message to a fixed WiFi AP within the wireless network that is known to be located proximate to the position;
when no response to the keep alive message is received from the fixed AP by the AC, determining, by the AC, a network outage has occurred at the position.

7. The AC of claim 1, wherein the dispatch command comprises one or more of:
an identification of a fixed WiFi AP within the wireless network;
a destination;
a route to destination.

8. The AC of claim 7, wherein said sending, by the AC, a dispatch command to a first unmanned vehicle that carries a movable WiFi access point (AP) to instruct the first unmanned vehicle to move to the position further comprises:
determining, by the AC, current positions of a plurality of unmanned vehicles, wherein the plurality of unmanned vehicles includes the first unmanned vehicle; and
selecting, by the AC, the first unmanned vehicle from among the plurality of unmanned vehicles based on the current position of the first unmanned vehicle.

9. The AC of claim 1, wherein the method further comprises pushing, by the AC, an AP profile of the wireless network to the first movable AP.

10. The AC of claim 1, wherein the method further comprises:
detecting, by the AC, a current position of the first unmanned vehicle; and
responsive to determining the first unmanned vehicle has not arrived at the position within a predetermined period of time, sending, by the AC, a dispatch command to a second unmanned vehicle that carries a second movable AP to instruct the second unmanned vehicle to move to the position.

11. A movable WiFi access point (AP) comprising:
an unmanned vehicle that carries the movable AP to various positions within a wireless network;
an AP module that provides wireless networking service to clients associated with the wireless network; and
a command receiving module in communication with a WiFi access point controller (AC);
wherein responsive to receipt, by the command receiving module, of a dispatch command through a control tunnel from a dispatch command module in the AC instructing the unmanned vehicle to move to a position of a failed AP identified in the dispatch command:
the unmanned vehicle carries the movable AP to the position;
the movable AP receives a mesh profile of the wireless network pushed from the AC enabling the movable AP to join the wireless network at the position of the failed AP; and the AP module provides the wireless network service at the position.

12. The movable AP of claim 11, wherein the AP module connects to the wireless network via a mesh network root AP.

13. The movable AP of claim 11, wherein the movable AP further comprises a wireless backhaul network module connected to a wireless wide area network.

14. The movable AP of claim 11, wherein:
the command receiving module receives a route to the position from the AC; and
the unmanned vehicle carries the movable AP to the position by following the route.

15. The movable AP of claim 11, wherein:
the unmanned vehicle determines a route to the position; and
the unmanned vehicle carries the movable AP to the position by following the route.

16. The movable AP of claim 15, wherein the unmanned vehicle periodically reports its current position to the AC along the route to the position.

* * * * *